US012657071B2

(12) United States Patent
Pappuru et al.

(10) Patent No.: US 12,657,071 B2
(45) Date of Patent: Jun. 16, 2026

(54) SYSTEM AND METHOD FOR RECOMMENDING COST OPTIMIZATION OPTIONS FOR A CLOUD RESOURCE

(71) Applicant: Tata Consultancy Services Limited, Mumbai (IN)

(72) Inventors: Prasad Babu Pappuru, Bangalore (IN); Girish Phadke, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 532 days.

(21) Appl. No.: 18/201,876

(22) Filed: May 25, 2023

(65) Prior Publication Data

US 2023/0385123 A1     Nov. 30, 2023

(30) Foreign Application Priority Data

May 26, 2022    (IN) ............................. 202221030273

(51) Int. Cl.
G06F 9/50          (2006.01)
G06F 9/455         (2018.01)
(Continued)

(52) U.S. Cl.
CPC ........ G06F 9/5077 (2013.01); G06F 9/45558 (2013.01); G06Q 10/04 (2013.01);
(Continued)

(58) Field of Classification Search
CPC .............. G06F 9/5077; G06F 9/45558; G06F 2009/45591; G06Q 10/0631; G06Q 10/04
(Continued)

(56) References Cited

U.S. PATENT DOCUMENTS 8,799,431 B2 *   8/2014   Pabari .................... G06F 9/455
                                                           709/224
10,026,070 B2    7/2018   Thorpe et al.
                         (Continued)

OTHER PUBLICATIONS

Mansouri et al., "Cost Optimization for Dynamic Replication and Migration of Data in Cloud Data Centers," IEEE Transactions on Cloud Computing (2017).
(Continued)

*Primary Examiner* — Jacob D Dascomb
(74) *Attorney, Agent, or Firm* — FINNEGAN, HENDERSON, FARABOW, GARRETT & DUNNER LLP

(57)          ABSTRACT

Embodiments herein provide a method and system for recommending cost optimization options for a cloud resource. The system and method employ a predefined library of optimization models to determine a best cost optimization options for a cloud resource. The one or more cloud optimization models will be available for different cloud resource type. Each cloud optimization model includes one or more cost optimization levers that can be applied to a cloud resource type. Each of the cost optimization lever includes one or more criteria to check for a condition based on the inputs provided. This criteria will generally be different for business critical and non-mission critical applications. Usage patterns, where each usage pattern is a combination of one or more optimization levers that can be applied together, including the sequence in which to apply. Herein, each criteria to shortlist the best cost saving options.

10 Claims, 4 Drawing Sheets

(51) Int. Cl.
*G06Q 10/04* (2023.01)
*G06Q 10/0631* (2023.01)
*G06Q 30/0201* (2023.01)

(52) U.S. Cl.
CPC ..... *G06Q 10/0631* (2013.01); *G06Q 30/0206* (2013.01); *G06F 2009/45591* (2013.01)

(58) Field of Classification Search
USPC ..................................................... 718/1, 104
See application file for complete search history.

(56) References Cited

U.S. PATENT DOCUMENTS

| | | | |
|---|---|---|---|
| 10,389,586 B2 * | 8/2019 | Hockett | .............. H04L 41/5041 |
| 2014/0278807 A1 * | 9/2014 | Bohacek | ............ G06Q 30/0206 |
| | | | 705/7.35 |
| 2014/0280961 A1 * | 9/2014 | Martinez | ................. H04L 41/40 |
| | | | 709/226 |
| 2018/0077029 A1 * | 3/2018 | Mittal | ................. H04L 41/5096 |
| 2019/0163517 A1 * | 5/2019 | Fontoura | ................ G06N 20/00 |
| 2020/0311573 A1 * | 10/2020 | Desai | .................... H04L 47/826 |
| 2021/0264340 A1 | 8/2021 | Marappagounder | |

OTHER PUBLICATIONS

Yahia et al., "Comprehensive Survey for Cloud Computing Based Nature-Inspired Algorithms Optimization Scheduling," Asian Journal of Research in Computer Science, 8(2):1-16 (2021).

* cited by examiner

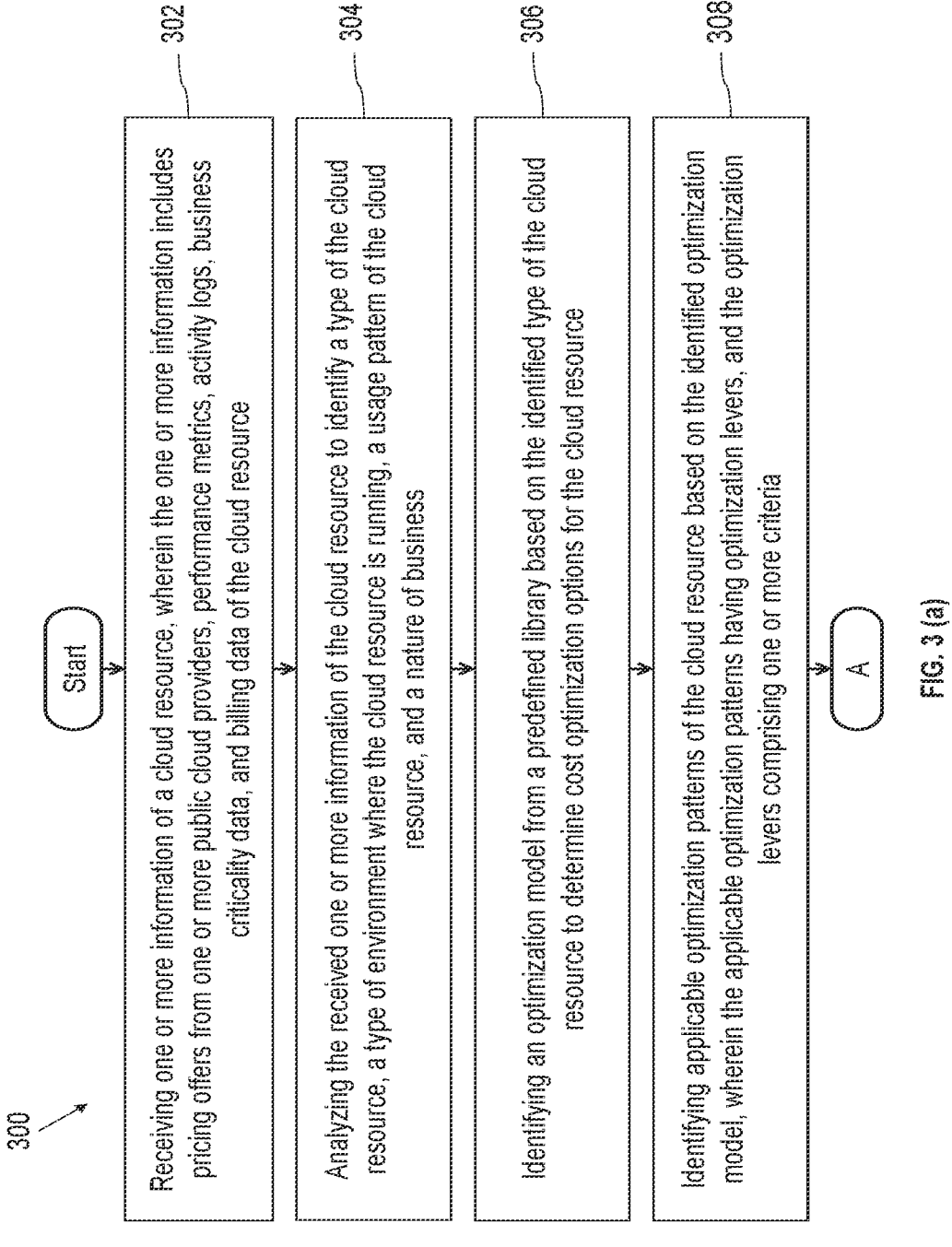

300

Start

Receiving one or more information of a cloud resource, wherein the one or more information includes pricing offers from one or more public cloud providers, performance metrics, activity logs, business criticality data, and billing data of the cloud resource — 302

Analyzing the received one or more information of the cloud resource to identify a type of the cloud resource, a type of environment where the cloud resource is running, a usage pattern of the cloud resource, and a nature of business — 304

Identifying an optimization model from a predefined library based on the identified type of the cloud resource to determine cost optimization options for the cloud resource — 306

Identifying applicable optimization patterns of the cloud resource based on the identified optimization model, wherein the applicable optimization patterns having optimization levers, and the optimization levers comprising one or more criteria — 308

SYSTEM AND METHOD FOR RECOMMENDING COST OPTIMIZATION OPTIONS FOR A CLOUD RESOURCE

CROSS-REFERENCE TO RELATED APPLICATIONS AND PRIORITY

This U.S. patent application claims priority under 35 U.S.C. § 119 to Indian Application number 202221030273, filed on May 26, 2022. The entire contents of the aforementioned application are incorporated herein by reference.

TECHNICAL FIELD

The disclosure herein generally relates to the field of cost optimization options for a cloud resource and more particularly, to a method and system for recommending one or more cost optimization options for a cloud resource.

BACKGROUND

In the current scenario, cloud cost optimization is one the of the top priority for many customers. Lack of visibility into the utilization of provisioned cloud resources and inability to control cloud spend are major concerns. Cloud platforms offer varied options to save cost such as pricing models, performance tiers, on-demand scaling, hybrid licensing benefits, right sizing, reservations etc. Optimization levers can be applied in the context of business criticality, environment type, and usage patterns to better optimize the cloud resources utilization and cloud spend.

Most of existing models are considering only right sizing and reservations (long term commitments) as cost optimization levers. And these levers are often considered individually. Business criticality, environment type (production, acceptance, test, or development) and usage patterns (Business Hours, Weekdays, or Always on) are not taken into consideration to provide more relevant cost optimization options.

SUMMARY

Embodiments of the disclosure present technological improvements as solutions to one or more of the above-mentioned technical problems recognized by the inventors in conventional systems. For example, in one embodiment, a method and system for recommending one or more cost optimization options for a cloud resource is provided.

In one aspect, a processor-implemented method for recommending one or more cost optimization options for a cloud resource. The processor-implemented method comprising receiving one or more information of a cloud resource, wherein the one or more information includes one or more pricing offers from one or more public cloud providers and analyzing the received one or more information of the cloud resource to identify a type of the cloud resource, a type of environment where the cloud resource is running, a usage pattern of the cloud resource, and a nature of business. An optimization model is identified from a predefined library based on the identified type of the cloud resource to determine one or more cost optimization options for the cloud resource, and one or more applicable optimization patterns of the cloud resource are identified based on the optimization model. Further, the method comprising validating each of the one or more criteria based on the received one or more information of the cloud resource to select at least one of the one or more applicable optimization patterns. The validation process continues until each of the one or more optimization levers in each of the one or more applicable optimization patterns are validated. At least one target state is determined for the selected at least one of the one or more applicable optimization patterns of the cloud resource. Furthermore, the method comprising forecasting a utilization cost of the determined at least one target state for the one or more applicable optimization patterns of the cloud resource and recommending one or more cost optimization options based on the forecasted utilization cost for the one or more applicable optimization patterns of the cloud resource. An optimal target state is identified based on the forecasted utilization cost for the processed each of the one or more applicable optimization patterns, wherein the identified optimal target state recommends maximum cost savings.

In another aspect, a system for recommending one or more cost optimization options for a cloud resource is provided. The system includes an input/output interface configured to receive one or more information of a cloud resource, one or more hardware processors and at least one memory storing a plurality of instructions, wherein the one or more hardware processors are configured to execute the plurality of instructions stored in the at least one memory.

Further, the system is configured to analyze the received one or more information of the cloud resource to identify a type of the cloud resource, identify an optimization model from a predefined library based on the identified type of the cloud resource to determine one or more cost optimization options for the cloud resource, and identify one or more applicable optimization patterns of the cloud resource based on the identified optimization model. Each of the one or more applicable optimization patterns having at one or more optimization levers, and each of the one or more optimization levers comprising one or more criteria. Further, the system is configured to validate each of the one or more criteria based on the received one or more information of the cloud resource to select at least one of the one or more applicable optimization patterns, determine at least one target state for the selected at least one of the one or more applicable optimization patterns of the cloud resource, forecast a utilization cost of the determined at least one target state for the one or more applicable optimization patterns of the cloud resource, and recommend one or more cost optimization options based on the forecasted utilization cost for the one or more applicable optimization patterns of the cloud resource. An optimal target state based on the forecasted utilization cost for the processed each of the one or more applicable optimization patterns. Herein, the identified optimal target state recommends maximum cost savings.

In yet another aspect, one or more non-transitory machine-readable information storage mediums are provided comprising one or more instructions, which when executed by one or more hardware processors causes a method for recommending one or more cost optimization options for a cloud resource is provided. The processor-implemented method comprising receiving one or more information of a cloud resource, wherein the one or more information includes one or more pricing offers from one or more public cloud providers and analyzing the received one or more information of the cloud resource to identify a type of the cloud resource, a type of environment where the cloud resource is running, a usage pattern of the cloud resource, and a nature of business. An optimization model is identified from a predefined library based on the identified type of the cloud resource to determine one or more cost optimization options for the cloud resource, and one or more applicable optimization patterns of the cloud resource are identified based on the optimization model. Further, the method validating each of the one or more criteria based on the received one or more information of the cloud resource to select at least one of the one or more applicable optimization patterns. The validation process continues until each of the one or more optimization levers in each of the one or more applicable optimization patterns are validated. At least one target state is determined for the selected at least one of the one or more applicable optimization patterns of the cloud resource. Furthermore, the method comprising forecasting a utilization cost of the determined at least one target state for the one or more applicable optimization patterns of the cloud resource and recommending one or more cost optimization options based on the forecasted utilization cost for the one or more applicable optimization patterns of the cloud resource. An optimal target state is identified based on the forecasted utilization cost for the processed each of the one or more applicable optimization patterns, wherein the identified optimal target state recommends maximum cost savings.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for recommending one or more cost optimization options for a cloud resource. The system and method employ a predefined library of one or more optimization models to determine the best cost optimization options for a cloud resource. The one or more cloud optimization models are available for different cloud resource type. Each cloud optimization model includes one or more cost optimization levers that can be applied to a cloud resource type. Each of the cost optimization lever includes one or more criteria to check for a condition based on the inputs provided. This criteria may generally be different for business critical and non-mission critical applications. Usage patterns, where each usage pattern is a combination of one or more optimization levers that can be applied together, including the sequence in which to apply. Herein, each criteria to shortlist the best cost saving options.

Figure 1:
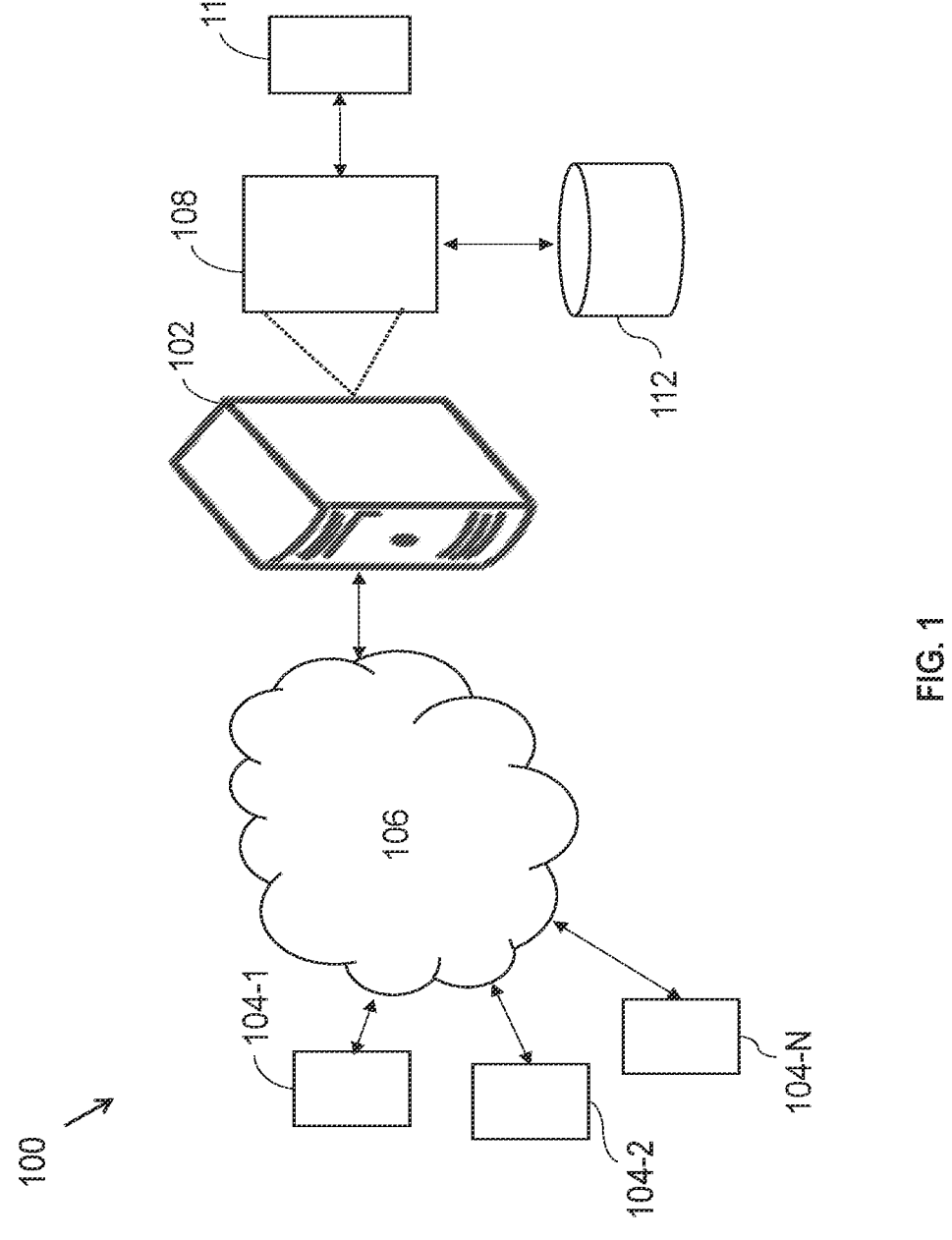
FIG. 1 illustrates block diagram of an exemplary system for recommending one or more cost optimization options for a cloud resource, in accordance with some embodiments of the present disclosure.
Figure 2:
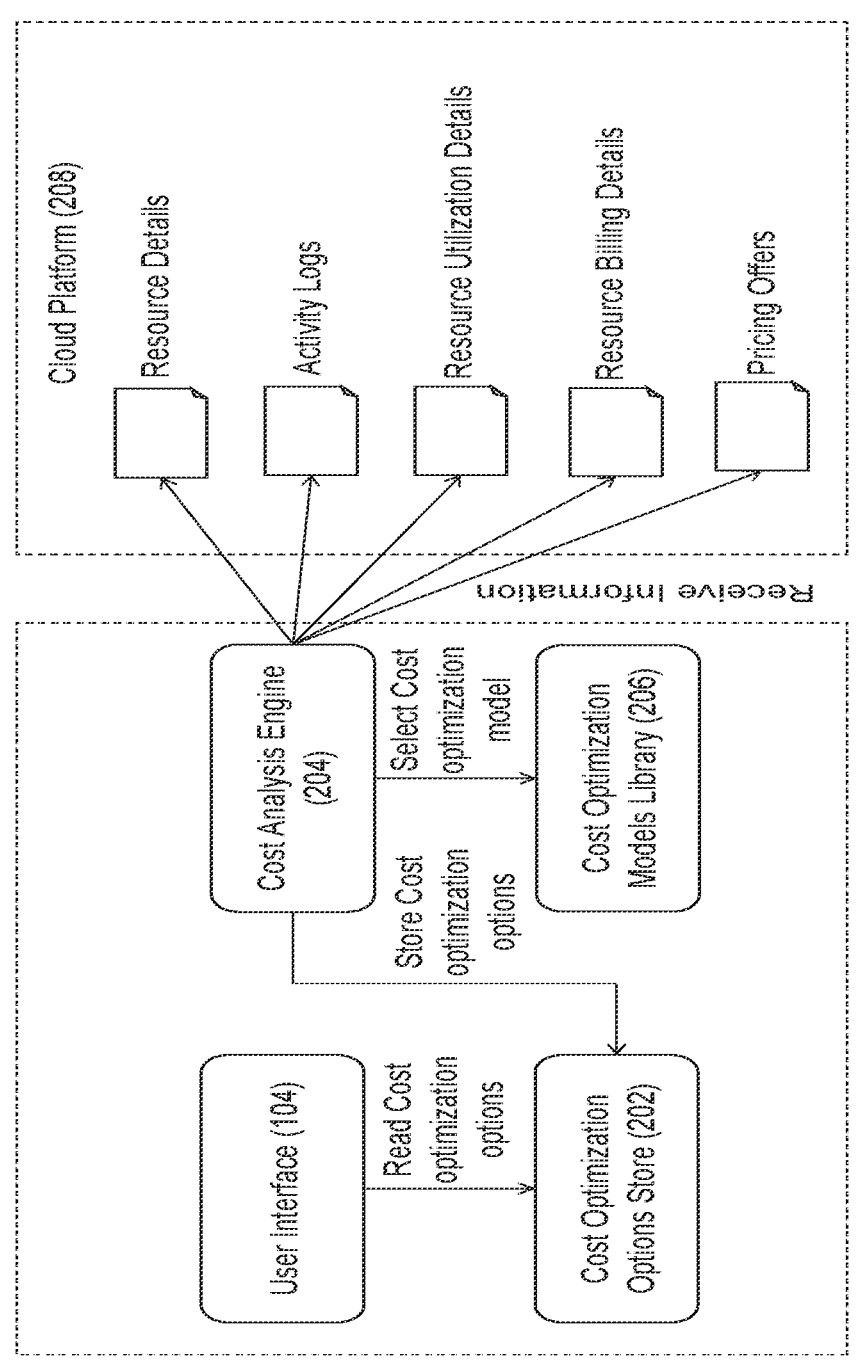
FIG. 2 is a functional block diagram of the system for recommending one or more cost optimization options for a cloud resource, in accordance with some embodiments of the present disclosure.
Figure 3:
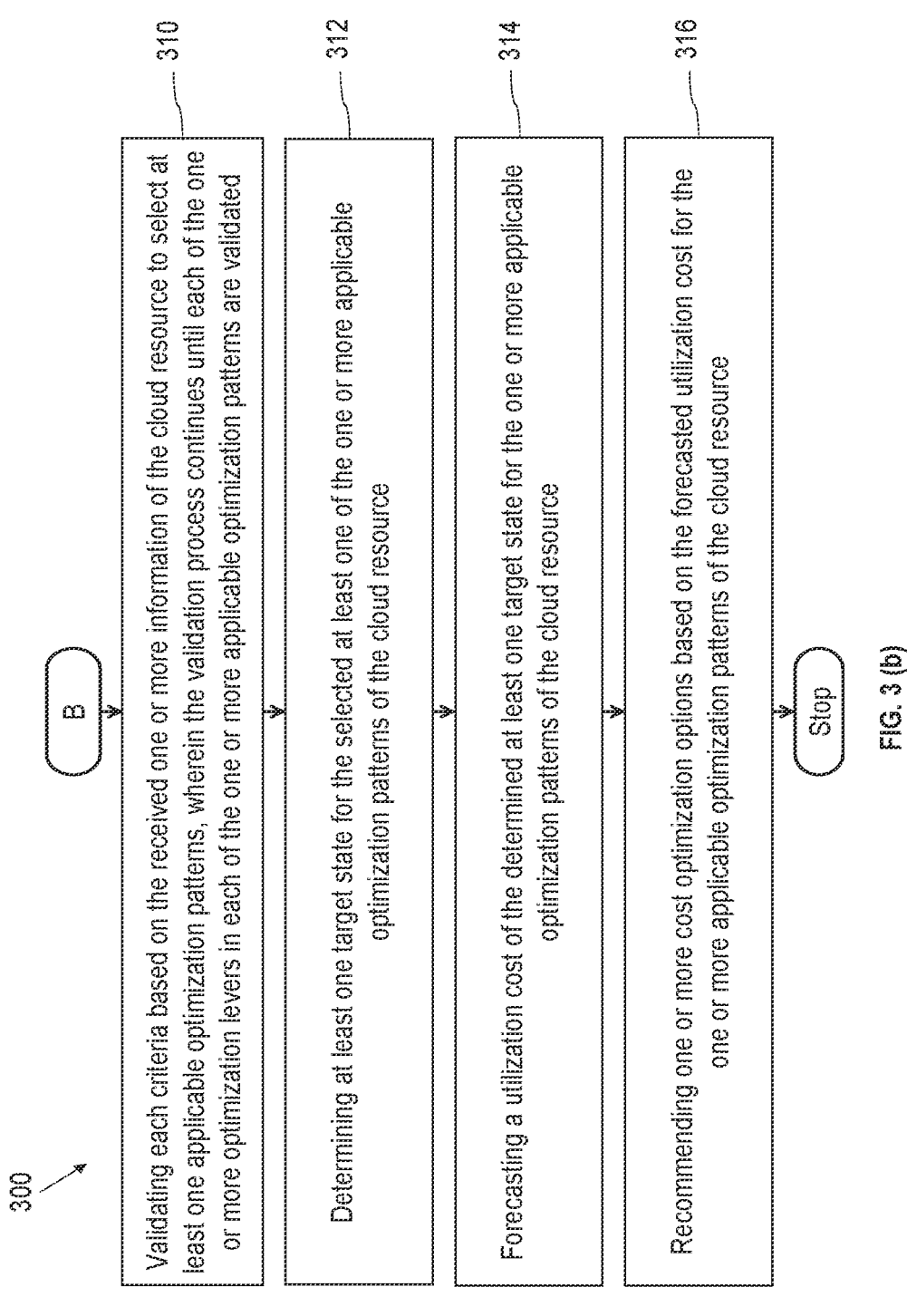
FIGS. 3(*a*) & 3(*b*) (collectively referred as FIG. 3) is a flow diagram to illustrate a method for recommending one or more cost optimization options for a cloud resource, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates a block diagram of a system (100) for recommending one or more cost optimization options for a cloud resource, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory with a plurality of instructions, one or more databases (112), and one or more hardware processors (108) which are communicatively coupled with the at least one memory to execute a plurality of instructions therein. The components and functionalities of the system (100) are described further in detail.

The one or more I/O interfaces (104) of the system (100) are configured to receive one or more information of a cloud resource, wherein the one or more information includes performance metrics, activity logs, business criticality data, billing data, and a pricing of the cloud resource.

Referring FIG. 2, illustrates a functional block diagram (200) of the system (100) for recommending one or more cost optimization options for a cloud resource, in accordance with an example embodiment. There is a cost analysis engine (204) of the system (100) which is responsible to analyze cloud resource and generate cost optimization options. The cost analysis engine (204) receives information related to cloud resources from a cloud platform (208). Based on the information received, a cost optimization model is picked from a predefined cost optimization models library (206). The cost analysis engine (204) uses the cost optimization model to analyze the cloud resource information and generates cost optimization options, which are stored in a data store. The I/O interfaces (104) of the system (100) reads the cost optimization options from cost optimization options store (202) and displays to user.

Further, the cost analysis engine (204) of the system (100) is configured to perform a comprehensive cost optimization analysis of software programs hosted on cloud platform (208). The one or more optimization models used by the cost analysis engine (204) for analysis are stored in the database. The cost analysis engine (204) is a core component of the system (100) that performs cost analysis. The system (100) reads the optimization model to be used for analyzing a particular type of cloud resource i.e. virtual machine, database etc. The system (100) connects to the cloud platform (208) to gather the data related to the cloud resource that is needed to perform the analysis. The system (100) generates a recommendation and stores in a data store if there is an option to save cost.

In another embodiment, the system (100) is configured to analyze the received one or more information of the cloud resource to identify a type of the cloud resource, a type of environment where the cloud resource is running, a usage pattern of the cloud resource, and a nature of business. The cloud resource can be broadly classified as mission critical or non-mission critical based on the nature of the software programs hosted on them. Mission critical cloud resources are given privileges such as using high service configuration (such as cores and memory for a virtual machine), using premium service tiers, always on etc.

The type of environment can be broadly classified as production or non-production environments. The production environments are given privileges similar to business criticality. The system (100) performs an intelligent analysis on the cloud resource to understand environment it is running in, current utilization, take into consideration different cost models offered by cloud providers and gives a recommendation on an optimal target state to achieve maximum savings.

In yet another embodiment, the system (100) is configured to identify an optimization model from a predefined library based on the identified type of the cloud resource to determine one or more cost optimization options for the cloud resource. The identified optimization model is configured to suit the individual needs, if there are any cloud preferences or constraints. This makes the recommendations more acceptable and actionable within a given environment. The optimization model holistically considers all the possible cost optimization levers based on the type of cloud resource.

In one example, wherein a non-mission critical virtual machine using a premium series, underutilized, and is running in a non-production environment during business hours i.e., 12 hours per weekday. This virtual machine is running on an Azure cloud with F16 (16 core×32 GB RAM) configuration. It is assumed that the utilization of this resource is 25%. The monthly cost of running this virtual machine may be Rs 84,974. Monthly cost of F8 may be Rs. 42,487/— which will provide approximately 50% cost savings. The system determines that this is a non-mission critical cloud resource running in a non-production environment. So, a standard Bs series will be identified to be more suitable. Since its utilization is only 25%, a B8 ms (8 core×32 GB RAM) is recommended. Monthly cost of B8 ms is Rs 21,631, which will provide approximately 75% cost savings. Further on top of this, a usage pattern of the cloud resource is identified. Since the resource is only used during business hours, which is roughly 36% of time, the monthly cost of this cloud resource can be brought down to Rs. 7,787. This gives approximately 92% saving over the current cost.

In yet another embodiment, the system (100) is configured to identify one or more applicable optimization patterns of the cloud resource based on the identified optimization model. Each of the one or more applicable optimization patterns having one or more optimization levers, and each of the one or more optimization levers comprising one or more criteria.

Further, the system (100) is configured to validate each of the one or more criteria based on the received one or more information of the cloud resource to select at least one of the one or more applicable optimization patterns, wherein the validation process continues until each of the one or more levers in each of the one or more applicable optimization patterns are validated.

In another embodiment, the system (100) is configured to determine at least one target state for the selected at least one of the one or more applicable optimization patterns of the cloud resource. The target state includes recommended configuration, service tier, and pricing model. The configuration could specify number of CPUs, size of RAM, and service version for a virtual machine. service tier could be premier or standard tier. Pricing model could be pay-as-you-go or reservations.

In yet another embodiment, the system (100) is configured to forecast a utilization cost of the determined at least one target state for the one or more applicable optimization patterns of the cloud resource.

Referring Table 1, illustrating an optimization model of a virtual machine comprising four levers. Lever 1 has a criteria to check if the environment is Development or Test. Lever 2 has criteria to check if the business criticality is tier 3 or tier 4. Lever 3 has criteria to compare average CPU and average memory utilization with defined threshold values. Lever 4 has criteria to check the percentage billed hours per month and percentage non-reservation hours per month. Finally, there is a recommendation to be given when all the levers and the corresponding criteria are satisfied.

TABLE 1

| Pattern1 | Lever1 | Recommend RightSize with Reservations |
|---|---|---|
| | Lever2 | |
| | Lever3 | |
| | Lever4 | |
| Lever1 = Environment Type | Criteria: Environment = 'Dev' or 'Test' | Recommended Performance Tier |
| Lever2 = | Criteria: Criticality = | Recommended |

TABLE 1-continued

| Pattern1 | Lever1 | Recommend RightSize with Reservations |
|---|---|---|
| BusinessCriticality | 'T3' or 'T4 | Performance Tier |
| Lever3 = RightSize | Criteria: If Environment = 'Dev' or 'Test' (AvgCPU <60% And AvgMEM <60%) Else (AvgCPU <40% And AvgMEM <40%) | Recommended Configuration |
| Lever4 = Reservations | Criteria: PerBilledHrsPM >65% PerBilledNonResHrsPM >10% | Use Reservations |

Further, the system (100) is configured to recommend one or more cost optimization options based on the forecasted utilization cost for the one or more applicable optimization patterns of the cloud resource. As illustrated in the Table 1, one case of cost optimization option recommendation could be to downsize the virtual machine and purchase reservations.

Furthermore, the system (100) identifies an optimal target state based on the forecasted utilization cost for the processed each of the one or more applicable optimization patterns. Herein, the identified optimal target state recommends maximum cost savings.

Referring FIG. 3, to illustrate a processor-implemented method (300) for recommending one or more cost optimization options for a cloud resource is provided.

Initially, at step (302), receiving, via an input/output interface, one or more information of a cloud resource. The one or more information includes performance metrics, activity logs, business criticality data, billing data, and a pricing of the cloud resource.

At the next step (304), analyzing the received one or more information of the cloud resource to identify a type of the cloud resource, a type of environment where the cloud resource is running, a usage pattern of the cloud resource, and a nature of business. The type of cloud resource includes, but not limited to, a virtual machine and a database. The at least one usage pattern includes, but not limited to, business hours in a day, and number of working days in a week.

At the next step (306), identifying an optimization model from a predefined library based on the identified type of the cloud resource to determine one or more cost optimization options for the cloud resource.

At the next step (308), identifying one or more applicable optimization patterns of the cloud resource based on the identified optimization model. Each of the one or more applicable optimization patterns having one or more optimization levers, and each of the one or more optimization levers comprising one or more criteria. Each of the one or more cost optimization levers is in a predefined sequence.

At the next step (310), validating each of the one or more criteria based on the received one or more information of the cloud resource to select at least one of the one or more applicable optimization patterns. It would be appreciated that an outcome of a first optimization lever of the one or more optimization levers is used in an immediate next optimization lever. The validation process continues until each of the one or more levers in each of the one or more applicable optimization patterns are validated.

At the next step (312), determining at least one target state for the selected at least one of the one or more applicable optimization patterns of the cloud resource.

At the next step (314), forecasting a utilization cost of the determined at least one target state for the one or more applicable optimization patterns of the cloud resource.

Finally, at the step (316), recommending one or more cost optimization options based on the forecasted utilization cost for the one or more applicable optimization patterns of the cloud resource.

In another embodiment, an optimal target state is identified based on the forecasted utilization cost for the processed each of the one or more applicable optimization patterns. The identified optimal target state recommends maximum cost savings.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the problem of lack of visibility into the utilization of provisioned cloud resources and inability to control cloud spend. Most of existing models are considering only right sizing and reservations (long term commitments) cost optimization levers. And these levers are often considered individually. Embodiments herein provide a method and system for recommending cost optimization options for a cloud resource. The system and method employ a predefined library of optimization models to determine a best cost optimization options for a cloud resource. The one or more cloud optimization models will be available for different cloud resource type. Each cloud optimization model includes one or more cost optimization levers that can be applied to a cloud resource type. Each of the cost optimization lever includes one or more criteria to check for a condition based on the inputs provided. This criteria will generally be different for business critical and non-mission critical applications. Usage patterns, where each usage pattern is a combination of one or more optimization levers that can be applied together, including the sequence in which to apply. Herein, each criteria to shortlist the best cost saving options.

It is to be understood that the scope of the protection is extended to such a program and in addition to a computer-readable means having a message therein: such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for recommending one or more cost optimization options for a cloud resource comprising steps of:

receiving, via an input/output interface, one or more information of a cloud resource, wherein the one or more information includes one or more pricing offers from one or more public cloud providers, performance metrics, activity logs, business criticality data, and billing data of the cloud resource;

analyzing, via one or more hardware processors, the received one or more information of the cloud resource to identify a type of the cloud resource, a type of environment where the cloud resource is running, a usage pattern of the cloud resource, and a nature of business, wherein the cloud resource is classified as mission-critical cloud resource or non-mission-critical cloud resource based on a nature of software programs hosted thereon, and wherein the mission-critical cloud resource is assigned with elevated privileges including at least one of: use of high-service configurations comprising increased compute cores and a memory for virtual machines, access to premium service tiers, and enablement of always-on operational modes, wherein the type of environment is classified as a production environment or a non-production environment, wherein an intelligent analysis is performed on the cloud resource to determine an environment in which the cloud resource is operating, wherein the intelligent analysis evaluates current utilization of the cloud resource, and considers different cost models offered by cloud providers to generate a recommendation for an optimal target state configured to achieve maximum cost savings, wherein each usage pattern is a combination of one or more optimization levers applied together, including a sequence of application, wherein the recommendation is stored in a data store if there is an option to save cost;

generating, one or more cost optimization options using a cost analysis engine by analyzing cloud resource information, wherein the one or more cost optimization options are stored in a cost optimization options store, and wherein the input/output interface reads the one or more cost optimization options from the cost optimization options store and display to a user;

identifying, via one or more hardware processors, an optimization model from a predefined library based on the identified type of the cloud resource to determine the one or more cost optimization options for the cloud resource, wherein the identified optimization model considers cloud preferences and constraints, wherein the identified optimization model considers all possible cost-optimization levers based on the type of the cloud resource, wherein the identified optimization model downsizes the virtual machine and purchases reservations;

identifying, via the one or more hardware processors, one or more applicable optimization patterns of the cloud resource based on the identified optimization model, wherein each of the one or more applicable optimization patterns having one or more optimization levers, and each of the one or more optimization levers comprising one or more criteria, wherein the one or more criteria is different for business critical and non-mission critical applications;

validating, via the one or more hardware processors, each of the one or more criteria based on the received one or more information of the cloud resource to select at least one of the one or more applicable optimization patterns, wherein the validation process continues until each of the one or more optimization levers in each of the one or more applicable optimization patterns are validated;

determining, via the one or more hardware processors, at least one target state for the selected at least one of the one or more applicable optimization patterns of the cloud resource, wherein the target state includes a recommended configuration, a service tier, and a pricing model, wherein the recommended configuration specifies a number of Computer Processing Units (CPUs), a size of Random Access Memory (RAM) and a service version for the virtual machine;

forecasting, via the one or more hardware processors, a utilization cost of the determined at least one target state for the one or more applicable optimization patterns of the cloud resource;

recommending, via the input/output interface, the one or more cost optimization options based on the forecasted utilization cost for the one or more applicable optimization patterns of the cloud resource; and controlling cloud spend in response to real-time visibility into utilization of provisioned cloud resources.

2. The processor-implemented method of claim 1, further comprising:

identifying an optimal target state based on the forecasted utilization cost for the processed each of the one or more applicable optimization patterns, wherein the identified optimal target state recommends maximum cost savings.

3. The processor-implemented method of claim 1, wherein each of the one or more cost optimization levers is in a predefined sequence.

4. The processor-implemented method of claim 1, wherein an outcome of a first optimization lever of the one or more optimization levers is used in an immediate next optimization lever.

5. The processor-implemented method of claim 1, wherein the type of cloud resource includes a virtual machine and a database.

6. The processor-implemented method of claim 1, wherein the at least one usage pattern includes business hours in a day, and number of working days in a week.

7. A system for recommending one or more cost optimization options for a cloud resource, the system comprising:

an input/output interface to receive one or more information of a cloud resource, wherein the one or more information includes one or more pricing offers from one or more public cloud providers, performance metrics, activity logs, business criticality data, and billing data of the cloud resource; and a memory in communication with one or more hardware processors, wherein the one or more hardware processors are configured to execute programmed instructions stored in the memory to:

analyze the received one or more information of the cloud resource to identify a type of the cloud resource, a type of environment where the cloud resource is running, a usage pattern of the cloud resource, and a nature of business, wherein the cloud resource is classified as mission-critical cloud resource or non-mission-critical cloud resource based on a nature of software programs hosted thereon, and wherein the mission-critical cloud resource is assigned with elevated privileges including at least one of: use of high-service configurations comprising increased compute cores and a memory for virtual machines, access to premium service tiers, and enablement of always-on operational modes, wherein the type of environment is classified as a production environment or a non-production environment, wherein an intelligent analysis is performed on the cloud resource to determine an environment in which the cloud resource is operating, wherein the intelligent analysis evaluates current utilization of the cloud resource, and considers different cost models offered by cloud providers to generate a recommendation for an optimal target state configured to achieve maximum cost savings, wherein each usage pattern is a combination of one or more optimization levers applied together, including a sequence of application, wherein the recommendation is stored in a data store if there is an option to save cost;

generate, one or more cost optimization options using a cost analysis engine by analyzing cloud resource information, wherein the one or more cost optimization options are stored in a cost optimization options store, and wherein the I/O interface reads the one or more cost optimization options from the cost optimization options store and display to a user;

identify an optimization model from a predefined library based on the identified type of the cloud resource to determine the one or more cost optimization options for the cloud resource, wherein the identified optimization model considers cloud preferences and constraints, wherein the identified optimization model considers all possible cost-optimization levers based on the type of the cloud resource, wherein the identified optimization model downsizes the virtual machine and purchases reservations;

identify one or more applicable optimization patterns of the cloud resource based on the identified optimization model, wherein each of the one or more applicable optimization patterns having one or more optimization levers, and each of the one or more optimization levers comprising one or more criteria, wherein the one or more criteria is different for business critical and non-mission critical applications;

validate each of the one or more criteria based on the received one or more information of the cloud resource to select at least one of the one or more applicable optimization patterns, wherein the validation process continues until each of the one or more optimization levers in each of the one or more applicable optimization patterns are validated;

determine at least one target state for the selected at least one of the one or more applicable optimization patterns of the cloud resource, wherein the target state includes a recommended configuration, service tier, and pricing model, wherein the recommended configuration specifies a number of CPUs, size of RAM and service version for the virtual machine;

forecast a utilization cost of the determined at least one target state for the one or more applicable optimization patterns of the cloud resource;

recommend, the one or more cost optimization options based on the forecasted utilization cost for the one or more applicable optimization patterns of the cloud resource; and control, cloud spend in response to, real-time visibility into utilization of provisioned cloud resources.

8. The system of claim 7, further comprising:

identifying an optimal target state based on the forecasted utilization cost for processed each of the one or more applicable optimization patterns, wherein the identified optimal target state recommends maximum cost savings.

9. A non-transitory computer readable medium storing one or more instructions which when executed by one or more processors on a system, cause the one or more processors to perform method comprising steps of:

receiving, via an input/output interface, one or more information of a cloud resource, wherein the one or more information includes one or more pricing offers from one or more public cloud providers, performance metrics, activity logs, business criticality data, and billing data of the cloud resource;

analyzing, via one or more hardware processors, the received one or more information of the cloud resource to identify a type of the cloud resource, a type of environment where the cloud resource is running, a usage pattern of the cloud resource, and a nature of business, wherein the cloud resource is classified as mission-critical cloud resource or non-mission-critical cloud resource based on a nature of software programs hosted thereon, and wherein the mission-critical cloud resource is assigned with elevated privileges including at least one of: use of high-service configurations comprising increased compute cores and a memory for virtual machines, access to premium service tiers, and enablement of always-on operational modes, wherein the type of environment is classified as a production environment or a non-production environment, wherein an intelligent analysis is performed on the cloud resource to determine an environment in which the cloud resource is operating, wherein the intelligent analysis evaluates current utilization of the cloud resource, and considers different cost models offered by cloud providers to generate a recommendation for an optimal target state configured to achieve maximum cost savings, wherein each usage pattern is a combination of one or more optimization levers applied together, including a sequence of application, wherein the recommendation is stored in a data store if there is an option to save cost;

generating, one or more cost optimization options using a cost analysis engine by analyzing cloud resource information, wherein the one or more cost optimization options are stored in a cost optimization options store, and wherein the I/O interface reads the one or more cost optimization options from the cost optimization options store and displays to a user;

identifying, via one or more hardware processors, an optimization model from a predefined library based on the identified type of the cloud resource to determine the one or more cost optimization options for the cloud resource, wherein the identified optimization model considers cloud preferences and constraints, wherein the identified optimization model considers all possible cost-optimization levers based on the type of the cloud resource, wherein the identified optimization model downsizes the virtual machine and purchases reservations;

identifying, via the one or more hardware processors, one or more applicable optimization patterns of the cloud resource based on the identified optimization model, wherein each of the one or more applicable optimization patterns having one or more optimization levers, and each of the one or more optimization levers comprising one or more criteria, wherein the one or more criteria is different for business critical and non-mission critical applications;

validating, via the one or more hardware processors, each of the one or more criteria based on the received one or more information of the cloud resource to select at least one of the one or more applicable optimization patterns, wherein the validation process continues until each of the one or more optimization levers in each of the one or more applicable optimization patterns are validated;

determining, via the one or more hardware processors, at least one target state for the selected at least one of the one or more applicable optimization patterns of the cloud resource, wherein the target state includes a recommended configuration, service tier, and pricing model, wherein the recommended configuration specifies a number of Computer Processing Unit (CPUs), size of RAM and service version for the virtual machine;

forecasting, via the one or more hardware processors, a utilization cost of the determined at least one target state for the one or more applicable optimization patterns of the cloud resource;

recommending, via the input/output interface, the one or more cost optimization options based on the forecasted utilization cost for the one or more applicable optimization patterns of the cloud resource; and controlling, cloud spend in response to, real-time visibility into utilization of provisioned cloud resources.

10. The non-transitory computer readable medium of claim 9, further comprising:

identifying an optimal target state based on the forecasted utilization cost for processed each of the one or more applicable optimization patterns, wherein the identified optimal target state recommends maximum cost savings.

* * * * *